Patented Dec. 5, 1922.

1,438,101

UNITED STATES PATENT OFFICE.

ROBERT E. DIVINE, OF CINCINNATI, OHIO.

PROCESS FOR PURIFYING SLUDGE SULPHONIC ACIDS AND PRODUCT.

No Drawing.   Application filed August 11, 1920. Serial No. 402,823.

*To all whom it may concern:*

Be it known that I, ROBERT E. DIVINE, a citizen of the United States, residing at Cincinnati, in the county of Hamilton and State of Ohio, have invented certain new and useful Improvements in Processes for Purifying Sludge Sulphonic Acids and Product, of which the following is a specification.

The object of my invention is to obtain the sulphonic constituents of petroleum sulphonic sludge in such form and chemical combination as will permit and promote the removal therefrom of accompanying objectionable impurities, particularly coloring matters which are water soluble and, as such, interfere with the industrial application of the sulphonic constituents, for instance, for fat splitting purposes.

It is already known to remove coloring matter and free oil from sulphonic sludge by combining the sulphonic constituents with a soluble base such as soda and then subjecting an aqueous solution of the sodium salt to repeated extraction with naphtha.

In my process I make no attempt to remove free oil and oil soluble coloring matter, the purpose of my invention being as above indicated, to purify the sulphonic constituents from water soluble coloring matter and impurities and to obtain a product in such physical form and having qualities which particularly adapt it for application in industries.

According to my process petroleum hydrocarbon oil, particularly the heavier petroleum oils such as are being refined for the production of medicinal and lubricating oils, are treated with fuming sulfuric acid, the oil being subjected to repeated successive portions of acid as is customary. By the successive treatments of a body of oil with separate bodies of fuming sulfuric acid a series of acid sludges are produced which differ materially in sulphonic acid content. Each and all of such acid sludges may be treated by my process. However, I preferably select only the sludge or sludges which are found by experiment to be most suitable for the purpose in view.

The acid sludge is washed with water to free it from excess sulfuric acid. The washed sludge is then mixed with about 20% of its weight of aluminum sulfate in concentrated aqueous solution and the mixture boiled. The sulphonic constituents of the sludge combine with the aluminum forming a water insoluble compound which precipitates as a black sticky mass leaving a strongly acid mother liquor which is run to waste.

The precipitated aluminum sulphonic acid compound is now washed with boiling water, preferably by mixing the aluminum sulphonic acid compound with about an equal weight of water and boiling with live steam. The mixture after boiling is allowed to settle, the dirty water is separated and the sulphonic acid compound again washed in the same manner. The washing is repeated until the wash water is substantially free of color, indicating that the aluminum sulphonic acid compound is substantially free of water soluble coloring matter and other impurities.

The aluminum sulphonic acid compound or aluminum sulfonate after washing as above described is a dark viscous material, substantially free from water soluble impurities, fluid while hot and semi-fluid when cold and is substantially neutral and practically without action upon iron and steel. The product therefore forms a valuable medium for the transportation of the sulphonic ingredient because it can be shipped in tank cars and the sulphonic acids liberated at the point of consumption.

The sulphonic acids can be set free from the purified aluminum combination at the point of consumption by treating the aluminum compound with sulfuric acid in the following manner. The aluminum sulphonate is placed in a lead lined tank and mixed with say 20% of its weight of sulfuric acid of 30° Bé. The mixture is boiled thoroughly with live steam for about one hour and then allowed to settle. The sulphonic acids freed from their combination with aluminum by the acid treatment are insoluble in sulfuric acid of the strength named and separate, forming the upper layer comprising free sulphonic acid carrying a small amount of sulfuric acid, and in some instances a small amount of undecomposed sulfonates. The lower layer consists of a solution of aluminum sulfate and sulfuric acid. The two layers are separated and the sulfuric acid and aluminum sulfate contained in the lower layer run to waste or are otherwise disposed of. The upper layer comprising the freed sulphonic acid may if desirable or necessary be boiled again with sulfuric acid solution to decompose any undecomposed aluminum sulfonate.

The separated sulphonic acids produced as above described are readily miscible with water and constitute an active and suitable reagent for saponifying or splitting fats into its components, glycerine and fatty acid. The freedom of the product from water soluble coloring matter, is of especial utility in the hydrolysis of fats in that it makes possible the direct production of practically colorless aqueous glycerine solutions which is particularly desirable in fat splitting.

The fat splitting sulphonic acids obtained by my process besides being free from objectionable coloring matter may be made at minimum cost and have been found to be particularly efficient as a fat splitting agent.

I have described my preferred method of procedure and the reagents preferably employed but it is to be understood that my invention is not limited to the specific example of my process described. Compounds of aluminum other than the sulfate, such as, commercial alumina ($Al_2O_3.3H_2O$) or powdered metallic aluminum or compounds of metals other than aluminum, for instance, chromium and iron may also be employed for precipitating the impure sulphonic acids from acid sludge. Acids other than sulfuric may be employed for hydrolyzing the aluminum sulfonate product. From a commercial standpoint the use of aluminum sulfate as the precipitating agent and sulfuric acid as the hydrolyzing agent, however, are preferred.

I claim:

1. Process for producing a sulphonic fat splitting agent substantially free of water soluble impurities from material containing sulphonic acids with water soluble and oil soluble impurities which comprises, treating said material with a material containing aluminum whereby aluminum compounds of said sulphonic acids are formed, and washing said compounds with water.

2. Process for producing a sulphonic fat splitting agent substantially free of water soluble impurities from acid sludge containing sulphonic acids with oil soluble and water soluble impurities which comprises, adding a solution of aluminum salt to said acid sludge whereby aluminum sulphonates are precipitated, separating the precipitate from mother liquor, and washing the precipitate with hot water.

3. Process for producing a sulphonic fat splitting agent substantially free of water soluble impurities from acid sludge containing sulphonic acids with oil soluble and water soluble impurities which comprises, adding a solution of aluminum sulfate to said acid sludge, boiling the mixture, separating the resultant precipitate from mother liquor, and repeatedly washing said precipitate with hot water.

4. Process for preparing sulphonic acids substantially free of water soluble impurities which comprises treating a material containing free sulphonic acids and water soluble impurities with a salt of aluminum, separating the resulting precipitate from the reaction mixture, washing said precipitate with water, and hydrolyzing said precipitate.

5. Process for preparing a sulphonic acid fat splitting agent which comprises mixing a solution of aluminum sulfate with petroleum sulphonic acid sludge, boiling said mixture, separating the resulting precipitate from mother liquor, repeatedly washing said precipitate with water until the wash water is substantially colorless, hydrolyzing said washed precipitate with sulfuric acid and separating the resulting sulphonic acids from accompanying sulfuric acid and aluminum sulfate.

6. Process for preparing sulphonic acids free of water soluble coloring matter which comprises adding aluminum sulfate solution to petroleum sulphonic acid sludge, boiling the mixture, separating the resultant precipitate comprising aluminum sulfonates and coloring matter from mother liquor, boiling said precipitate with water, separating said precipitate from the wash water, repeating said washing operation until said precipitate is substantially freed of water soluble coloring matter, decomposing said precipitate into aluminum salt and sulphonic acids, and separating the sulphonic acids from the mixture.

7. Process as defined in claim 6 in which the petroleum sulphonic acid sludge is washed with water prior to the addition of aluminum sulfate solution thereto.

8. Process for producing a sulphonic fat splitting agent substantially free of water soluble impurities from petroleum sulphonic acid sludge containing sulphonic acids with oil soluble and water soluble impurities which comprises, treating said sludge with a solution of metal salt capable of reacting with sulphonic acids to form water insoluble compounds, and washing the resultant precipitate with water.

9. Process for producing a sulphonic fat splitting agent substantially free of oil soluble and water soluble impurities from petroleum sulphonic acid sludge containing sulphonic acids with oil soluble and water soluble impurities which comprises, combining sulphonic acids in said sludge with a metal capable of forming water insoluble compounds with said acids, and washing the resultant metal sulphonic acid compounds with water.

10. Process for preparing fat splitting sulphonic acids which comprises washing heavy hydrocarbon oils with a plurality of successive portions of fuming sulfuric acid, separating successive batches of acid sludge from said oil, adding a solution of aluminum sulfate to at least one selected batch of said batches of acid sludge, agitating and boiling the resultant mixture whereby a precipitate comprising aluminum sulphonates and impurities is formed, separating said precipitate from mother liquor, repeatedly washing said precipitate with boiling water until it is substantially free of water soluble impurities, treating said precipitate with dilute sulfuric acid whereby it is decomposed into sulphonic acids and aluminum sulfate, settling said mixture and separating the sulphonic acids from sulfuric acid and aluminum sulfate.

11. Sulphonic acid product derived from petroleum sulphonic sludge comprising metal sulfonate insoluble in water and free from water soluble impurities.

12. Sulphonic acid product comprising aluminum sulfonates derived from petroleum sulphonic sludge, said product being semi-liquid insoluble in water and without prohibitive corrosive action upon iron at ordinary temperatures.

13. Sulphonic acid product comprising aluminum sulfonates derived from petroleum sulphonic sludge, said product being substantially neutral, insoluble in water and semi-liquid at ordinary temperatures and substantially free from water soluble impurities.

In testimony whereof, I affix my signature.

ROBERT E. DIVINE.